(12) United States Patent
Hayashi et al.

(10) Patent No.: US 11,516,875 B2
(45) Date of Patent: Nov. 29, 2022

(54) DISTRIBUTED UNIT, CENTRAL UNIT, AND METHOD THEREFOR

(71) Applicant: NEC Corporation, Tokyo (JP)

(72) Inventors: Sadafuku Hayashi, Tokyo (JP); Hisashi Futaki, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 16/277,322

(22) Filed: Feb. 15, 2019

(65) Prior Publication Data

US 2020/0053817 A1 Feb. 13, 2020

(30) Foreign Application Priority Data

Aug. 9, 2018 (JP) .............................. JP2018-150709

(51) Int. Cl.
| | | |
|---|---|---|
| H04W 76/27 | (2018.01) | |
| H04B 7/0426 | (2017.01) | |
| H04W 68/00 | (2009.01) | |
| H04W 76/11 | (2018.01) | |

(52) U.S. Cl.
CPC ............. *H04W 76/27* (2018.02); *H04B 7/043* (2013.01); *H04W 68/005* (2013.01); *H04W 76/11* (2018.02)

(58) Field of Classification Search
CPC ............................... H04W 76/11; H04W 76/27
See application file for complete search history.

(56) References Cited

U.S. PATENT DOCUMENTS

| | | | | |
|---|---|---|---|---|
| 2018/0302878 | A1* | 10/2018 | Byun | H04W 88/16 |
| 2019/0053029 | A1* | 2/2019 | Agiwal | H04W 48/12 |
| 2019/0166526 | A1* | 5/2019 | Xu | H04W 36/08 |
| 2019/0253966 | A1* | 8/2019 | Park | H04L 5/0091 |

OTHER PUBLICATIONS

NEC, "Impact to F1 for SI reception in Connected mode", 3GPP TSG-RAN WG2 #102, R2-1808252, Busan, Korea, May 21-25, 2018, 3 pages total.
International Search Report dated Oct. 15, 2019, issued by the International Searching Authority in counterpart application No. PCT/JP2019/029283.
"CSS configuration for SI acquisition in non-initial BWP [C077]",CATT, R2-1810493, 3GPP TSG-RAN WG2 Meeting #AH-1807, Jul. 2018, pp. 1-6, Montreal, Canada.
"3rd Generation Partnership Project; Technical Specification Group Radio Access Network; NG-RAN; Architecture description (Release 15)", 3GPP TS 38.401 V15.2.0, Jun. 2018, pp. 1-39.
3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2; (Release 14); 3GPP TS 36.300 V14.7.0; Jun. 2018, pp. 1-331.

* cited by examiner

Primary Examiner — Sulaiman Nooristany
(74) Attorney, Agent, or Firm — Sughrue Mion, PLLC

(57) ABSTRACT

A gNB central unit (gNB-CU) includes a transmitter and a receiver. The transmitter is configured to transmit a message to a gNB distributed unit (gNB-DU). The receiver is configured to receive from the gNB-DU, in response to the message, a list indicating User Equipments (UEs) which needs to be notified by dedicated signaling of system information.

19 Claims, 12 Drawing Sheets

BWP INFORMATION

| IE / Groupe Name | Presence | Range | IE Type and reference | Semantics description | Criticality | Assigned Criticality |
|---|---|---|---|---|---|---|
| Message Type | M | | 9.3.1.1 | | YES | Ingnore |
| NR CGI | M | | 9.3.1.12 | NR cell identifier | - | |
| BWP List | | 1 | | | YES | reject |
| >BWP Item IEs | | 1 .. <maxnoof BWPs> | | | EACH | reject |
| >>BWP ID | M | 1 | 9.3.1.x1 | | - | - |
| >>UE ID List | | 1 .. <maxnoof UEs> | 9.3.1.x2 | | - | - |
| >>>UE ID Item | | | | | EACH | reject |
| >>>>C-RNTI | M | | 9.3.1.32 | | | |
| ...... | | | | | | |

UE CONTEXT MODIFICATION REQUIRED

| IE / Groupe Name | Presence | Range | IE Type and reference | Semantics description | Criticality | Assigned Criticality |
|---|---|---|---|---|---|---|
| Message Type | M | | 9.3.1.1 | | YES | reject |
| gNB-CU UE F1AP ID | M | | 9.3.1.4 | | YES | reject |
| gNB-DU UE F1AP ID | M | | 9.3.1.5 | | YES | reject |
| --- | | | | | | |
| UE switch to BWP | O | | BOOLEAN | "true" means UE was switched to BWP (with no CSS configuration) other than initial BWP. | YES | ignore |

DISTRIBUTED UNIT, CENTRAL UNIT, AND METHOD THEREFOR

INCORPORATION BY REFERENCE

This application is based upon and claims the benefit of priority from Japanese patent application No. 2018-150709, filed on Aug. 9, 2018, the disclosure of which is incorporated herein in its entirety by reference.

TECHNICAL FIELD

The present disclosure relates to a radio communication system and, in particular, to use of one or more bandwidth parts configured within one carrier bandwidth.

BACKGROUND ART

The 3rd Generation Partnership Project (3GPP) has been working on the standardization for the fifth generation mobile communication system (5G) to make 5G a commercial reality in 2020 or later. 5G is realized by continuous enhancement/evolution of LTE and LTE-Advanced and an innovative enhancement/evolution by an introduction of a new 5G air interface (i.e., a new Radio Access Technology (RAT)). The new RAT supports, for example, frequency bands higher than the frequency bands (e.g., 6 GHz or lower) supported by LTE/LTE-Advanced and its continuous evolution. For example, the new RAT supports centimeter-wave bands (10 GHz or higher) and millimeter-wave bands (30 GHz or higher).

In this specification, the fifth generation mobile communication system is referred to as a 5G System or a Next Generation (NextGen) System (NG System). The new RAT for the 5G System is referred to as a New Radio (NR), a 5G RAT, or a NG RAT. A new Radio Access Network (RAN) for the 5G System is referred to as a NextGen RAN (NG RAN) or a 5G-RAN. A new base station in the NG-RAN is referred to as a gNodeB (gNB). A new core network for the 5G System is referred to as a 5G Core Network (5GC) or a NextGen Core (NG Core). A radio terminal (i.e., User Equipment (UE)) capable of being connected to the 5G System is referred to as 5G UE or NextGen UE (NG UE), or simply referred to as UE.

The term "LTE" used in this specification includes enhancement/evolution of LTE and LTE-Advanced to provide interworking with the 5G System, unless otherwise specified. The enhancement/evolution of LTE and LTE-Advanced for the interworking with the 5G System is referred to as LTE-Advanced Pro, LTE+, or enhanced LTE (eLTE). Further, terms related to LTE networks and logical entities used in this specification, such as "Evolved Packet Core (EPC)", "Mobility Management Entity (MME)", "Serving Gateway (S-GW)", and "Packet Data Network (PDN) Gateway (P-GW))", include their enhancement/evolution to provide interworking with the 5G System, unless otherwise specified. Enhanced EPC, enhanced MME, enhanced S-GW, and enhanced P-GW are referred to, for example, as enhanced EPC (eEPC), enhanced MME (eMME), enhanced S-GW (eS-GW), and enhanced P-GW (eP-GW), respectively.

In LTE and LTE-Advanced, for achieving Quality of Service (QoS) and packet routing, a bearer per QoS class and per PDN connection is used in both a RAN (i.e., an Evolved Universal Terrestrial RAN (E-UTRAN)) and a core network (i.e., EPC). That is, in the Bearer-based QoS (or per-bearer QoS) concept, one or more Evolved Packet System (EPS) bearers are configured between a UE and a P-GW in an EPC, and a plurality of Service Data Flows (SDFs) having the same QoS class are transferred through one EPS bearer satisfying this QoS.

In contrast, with regard to the 5G System, although radio bearers may be used in the NG RAN, no bearers are used in the 5GC or in the interface between the 5GC and the NG-RAN. Specifically, QoS flows are defined instead of an EPS bearer, and one or more SDFs are mapped to one or more QoS flows. A QoS flow between a 5G UE and a user-plane terminating entity in an NG Core (i.e., an entity corresponding to a P-GW in the EPC) corresponds to an EPS bearer in the EPS Bearer-based QoS concept. The QoS flow corresponds to the finest granularity of the packet forwarding and treatment in the 5G system. That is, the 5G System adopts the Flow-based QoS (or per-flow QoS) concept instead of the Bearer-based QoS concept. In the Flow-based QoS concept, QoS is handled per QoS flow. Association between a 5G UE and a data network is referred to as a "PDU session". The term "PDU session" corresponds to the term "PDN connection" in LTE and LTE-Advanced. A plurality of QoS flows can be configured in one PDU session. The 3GPP specifications define a 5G QoS Indicator (5QI) corresponding to the QCI of the LTE for the 5G system.

FIG. 1 shows a basic architecture of a 5G system. The architecture shown in FIG. 1 is referred to as a "Standalone NR (in NextGen System)" or an "Option 2". A UE establishes one or more Signalling Radio Bearers (SRBs) and one or more Data Radio Bearers (DRBs) with a gNB. A 5GC and the gNB establish a control-plane interface and a user-plane interface for the UE. The control-plane interface between the 5GC and the gNB (i.e., RAN) is referred to as an NG-c interface and is used to transfer Non-Access Stratum (NAS) information and transfer control information between the 5GC and the gNB (e.g., an N2 AP Information Element). The user-plane interface between the 5GC and the gNB (i.e., the RAN) is referred to as NG-u interface and is used to transfer packets of one or more QoS flows in a PDU session of the UE.

The NR supports use of different sets of radio parameters in multiple frequency bands. Each radio parameter set is referred to as "numerology". OFDM numerology for an Orthogonal Frequency Division Multiplexing (OFDM) system includes, for example, subcarrier spacing, system bandwidth, Transmission Time Interval (TTI) length, subframe duration, cyclic prefix length, and symbol duration. The 5G system supports various types of services having different service requirements, including, for example, enhanced Mobile Broad Band (eMBB), Ultra Reliable and Low Latency Communication (URLLC), and M2M communication with a large number of connections (e.g., massive Machine Type Communication (mMTC)). Numerology selection depends on the service requirement.

The NR supports channel bandwidths wider than those of the LTE (e.g., 100s of MHz). One channel bandwidth (i.e., a $BW_{Channel}$) is a radio frequency (RF) bandwidth supporting one NR carrier. The channel bandwidth is also referred to as a system bandwidth. While the LTE supports channel bandwidths up to 20 MHz, the 5G NR supports channel bandwidths, for example, up to 500 MHz.

In order to efficiently support multiple 5G services, for example, broadband services, such as eMBBs, and narrow-band services, such as Internet of Things (IoT), it is preferable to be able to multiplex these services onto a single channel bandwidth. Further, if every 5G UE has to support transmission and reception in a transmission bandwidth corresponding to the entire channel bandwidth, it may be impossible to reduce the cost of UEs and the power consumption of UEs for the narrowband IoT service. Accordingly, the 3GPP allows one or more bandwidth parts (BWPs) to be configured in the carrier bandwidth (i.e., the channel bandwidth or the system bandwidth) of each NR component carrier. The bandwidth part is also referred to as a carrier bandwidth part. Multiple BWPs may be used for different frequency division multiplexing (FDM) schemes using different numerologies (e.g., subcarrier spacing (SCS)). For example, multiple BWPs may have different SCSs and different bandwidths.

FIGS. 2 and 3 show examples of use of BWPs. In the example shown in FIG. 2, the channel bandwidth of one component carrier is divided into BWP #1 and BWP #2, and these two BWPs are used for different FDM schemes using different numerologies (e.g., different subcarrier spacing). In the example shown in FIG. 3, narrowband BWP #1 is set in a channel bandwidth of one component carrier and narrowband BWP #2 narrower than BWP #1 is further set within the BWP #1. When BWP #1 or BWP #2 is activated for a UE, the UE can reduce its power consumption by refraining from performing reception and transmission within the channel bandwidth except the active BWP.

One bandwidth part (BWP) is frequency-consecutive and consists of contiguous physical resource blocks (PRBs). The bandwidth of one BWP is at least as large as a synchronization signal (SS)/physical broadcast channel (PBCH) block. The BWP may or may not contain a SS/PBCH block (SSB).

A BWP configuration includes, for example, numerology, a frequency location, and a bandwidth (e.g., the number of PRBs). In order to specify the frequency location, common PRB indexing is used at least for a downlink (DL) BWP configuration in a Radio Resource Control (RRC) connected state. Specifically, an offset from PRB 0 to the lowest PRB of the SSB to be accessed by a UE is configured by higher layer signaling. The reference point "PRB 0" is common to all the UEs that share the same wideband component carrier.

One SS/PBCH block includes primary signals necessary for an idle UE, such as NR synchronization signals (NR-SS) and an NR physical broadcast channel (NR-PBCH). The NR-SS is used by the UE for DL synchronization. A Reference Signal (RS) is transmitted in the SS/PBCH block to enable an idle UE to perform Radio Resource Management (RRM) measurement (e.g., RSRP measurement). This RS may be the NR-SS itself or may be an additional RS. The NR-PBCH broadcasts part of the minimum System Information (SI), for example a Master Information Block (MIB). The remaining minimum SI (RMSI) is transmitted on a Physical Downlink Shared Channel (PDSCH).

A network can transmit multiple SS/PBCH blocks within the channel bandwidth of one wideband component carrier. In other words, SS/PBCH blocks may be transmitted in a plurality of BWPs within the channel bandwidth. In a first scheme, all the SS/PBCH blocks within one broadband carrier are based on NR-SS (e.g., a primary SS (PSS) and a secondary SS (SSS)) corresponding to the same physical-layer cell identity. In a second scheme, different SS/PBCH blocks within one broadband carrier may be based on NR-SSs corresponding to different physical-layer cell identities.

From a UE perspective, a cell is associated with one SS/PBCH block. Therefore, for UEs, each serving cell has a single associated SS/PBCH block in frequency domain. Note that, each serving cell is a primary cell (PCell) in carrier aggregation (CA) and dual connectivity (DC), a primary secondary cell (PSCell) in DC, or a secondary cell (SCell) in CA and DC. Such an SSB is referred to as a cell defining SS/PBCH block. The Cell defining SS/PBCH block has an associated RMSI. The Cell defining SS/PBCH block is used as the time reference or the timing reference of the serving cell. Further, the Cell defining SS/PBCH block is used for SS/PBCH block (SSB) based RRM Measurements. The Cell defining SS/PBCH block can be changed for the PCell/PSCell by "synchronous reconfiguration" (e.g., reconfiguration of radio resource configuration information using an RRC Reconfiguration procedure and not involving a handover), while it can be changed for SCells by "SCell release/add".

One or more BWP configurations for each component carrier are semi-statically signaled to the UE. Specifically, for each UE-specific serving cell, one or more DL BWPs (e.g., up to 4 DL BWPs) and one or more UL BWPs (e.g., up to 4 UL BWPs) can be configured for the UE via a dedicated RRC message. One or more DL BWPs and one or more UL BWPs configured for the UE are referred to as a "DL BWP set" and a "UL BWP set", respectively.

Each of one or more BWPs (i.e., BWP set) configured for the UE can be activated and deactivated. A BWP that has been activated is referred to as an "active BWP". Specifically, the UE receives signals on one or more active DL BWPs in the configured DL BWP set at a given time. Similarly, the UE transmits signals on one or more active UL BWPs in the configured UL BWP set at a given time. Note that in the current specifications, at most one DL BWP and at most UL BWP are activated at a given time.

The activation/deactivation of a BWP is determined by a lower layer (e.g., a Physical (PHY) layer or a Medium Access Control (MAC) layer), rather than by the RRC layer. Switching of the Active BWP is performed by, for example, Downlink Control Information (DCI) (e.g., scheduling DCI) transmitted on an NR Physical Downlink Control Channel (PDCCH). In other words, deactivation of a current active BWP and activation of a new active BWP may be performed by the DCI in the NR PDCCH. The network can activate/deactivate a BWP depending, for example, on a data rate, or on numerology required by a service, and can thereby dynamically switch the active BWP for the UE.

A BWP (i.e., initial active BWP) where the UE initially stays when the UE accesses a serving cell (i.e., when the UE transitions from Idle mode to Connected mode) is referred to as an "initial BWP". The initial BWP includes at least a DL BWP and may include a UL BWP (when an uplink is configured for the serving cell). The initial BWP may also referred to as a default BWP, a reference BWP, a primary BWP, an anchor BWP, or a master BWP. The BWP set configured for the UE always includes the initial BWP.

The initial BWP is always configured with a Common Search Space. Meanwhile, BWPs other than the initial BWP may or may not be configured with a Common Search Space. Note that, the Common Search Space is a subset of resources (i.e., a PDCCH Search Space) in which the UE performs blind decoding to find PDCCH data (i.e., DCI). Similarly to LTE, in the 5G system, the PDCCH Search Space includes the Common Search Space and a UE-specific Search Space. The UE-specific search space is configured individually for each UE through RRC signaling. Meanwhile, all the UEs that access the serving cell are aware of the extent or range of the Common Search Space. The NR Common Search Space is used to broadcast, for example, system information, paging, and a random access channel (RACH) response. The NR Common Search Space includes a "Type0-PDCCH common search space". In the Type0-

PDCCH common search space, a PDCCH (i.e., DCI) that is scrambled with a System Information Radio Network Temporary Identifier (SI-RNTI) is transmitted in order to enable the UE to receive a System Information Block Type 1 (SIB1).

In the 3GPP, it has been discussed that if the UE's active DL BWP is configured with no Common Search Space (CSS), the UE is not required to receive a system information update (SI update) through a broadcast (see, for example, NPL1). In this case, the network (i.e., NG-RAN) may transmit updated SI, via dedicated signaling (e.g., an RRC Reconfiguration message), to the UE staying in the active DL BWP that is not configured with any Common Search Spaces.

Next, cloud RAN (C-RAN) deployment of the NG-RAN is described. FIG. 4 shows an overall architecture of the NG-RAN (see NPL2). The NG-RAN consists of a set of gNBs connected to a 5GC via respective NG interfaces. The gNBs can be connected to each other via an Xn interface. As shown in FIG. 4, each gNB may consist of a gNB Central Unit (gNB-CU) and one or more gNB Distributed Units (gNB-DUs). The gNB-CU and the gNB-DU are connected to each other through an F1 interface. The gNB-CU is a logical node that hosts RRC, Service Data Adaptation Protocol (SDAP), and Packet Data Convergence Protocol (PDCP) protocols of the gNB (or hosts the RRC and PDCP protocols of the gNB). The gNB-DU is a logical node that hosts Radio Link Control (RLC), MAC, and PHY Layers of the gNB.

Non-Patent Literature

NPL1: CATT, "CSS configuration for SI acquisition in non-initial BWP [C077]", R2-1810493, 3GPP TSG-RAN WG2 Meeting #AH-1807, Montreal, Canada, Jul. 2-Jul. 6, 2018
NPL2: 3GPP TS 38.401 V15.2.0 (2018-06), "3rd Generation Partnership Project; Technical Specification Group Radio Access Network; NG-RAN; Architecture description (Release 15)", June 2018

SUMMARY

The inventors have considered issues exist when a gNB-CU transmits an SI update to UEs via dedicated signaling. The gNB-CU transmits the updated SI, via dedicated signaling, to UEs staying in their respective active DL BWPs that are not configured with any Common Search Spaces. Therefore, it is preferable that the gNB-CU can be aware of the UEs staying in the active DL BWPs that are not configured with any Common Search Spaces.

However, as described above, the active BWP is changed, for example, by DCI on a NR PDCCH. Accordingly, in some implementations, the gNB-DU may determine a change of the active BWP for the UE and transmit DCI to the UE to change the active BWP. In this case, the gNB-CU may not be aware of which one of the set of DL BWPs configured for the UE is the active DL BWP. In other words, the gNB-CU may not have knowledge about the active DL BWP of each UE. In addition, in some implementations, the gNB-DU may determine whether to configure a Common Search Space in a non-initial BWP. In this case, the gNB-CU may not be aware of whether a Common Search Space is configured in each non-initial BWP included in the DL BWP set for the UE.

Thus there is a possibility that the gNB-CU cannot be aware of UEs, each of which stays in an active DL BWP that is not configured with a Common Search Space. Further, for other purposes or uses, in addition to or instead of the transmission of the SI update, it may be preferable that the gNB-CU can be aware of UEs, each of which stays in an active DL BWP that is configured with no Common Search Space.

One of the objects to be attained by embodiments disclosed herein is to provide an apparatus, a method, and a program that contribute to enabling a central unit (e.g., an gNB-CU) of a base station (e.g., a gNB) to be aware of radio terminals (e.g., UEs), each of which stays in an active bandwidth part that is not configured with a Common Search Space. It should be noted that the above-described object is merely one of the objects to be attained by the embodiments disclosed herein. Other objects or problems and novel features will be made apparent from the following description and the accompanying drawings.

In a first aspect, a distributed unit of a base station includes at least one memory and at least one processor coupled to the at least one memory. The at least one processor is configured to send at least one terminal list to a central unit of the base station. The at least one terminal list indicates at least one of:
(a) a plurality of radio terminals, each of which is not configured with a Common Search Space (CSS) in an active downlink Bandwidth Part (BWP);
(b) a plurality of radio terminals, each of which is not configured with at least a Search Space (SS) used for receiving system information in an active downlink BWP;
(c) a plurality of radio terminals that need to receive updated system information via dedicated signaling for each radio terminal;
(d) a plurality of radio terminals, an active downlink BWP of each of which is a non-initial downlink BWP; and
(e) a plurality of radio terminals that are performing reception on each of downlink BWPs.

In a second aspect, a central unit of a base station includes at least one memory and at least one processor coupled to the at least one memory. The at least one processor is configured to receive at least one terminal list from a distributed unit of the base station. The at least one terminal list is similar to that of the first aspect.

In a third aspect, a method for a distributed unit of a base station includes sending at least one terminal list to a central unit of the base station. The at least one terminal list is similar to that of the first aspect.

In a fourth aspect, a method for a central unit of a base station includes receiving at least one terminal list from a distributed unit of the base station. The at least one terminal list is similar to that of the first aspect.

In a fifth aspect, a distributed unit of a base station includes at least one memory and at least one processor coupled to the at least one memory. The at least one processor is configured to send, to a central unit of the base station, a message containing an information element indicating a change of an active downlink Bandwidth Part (BWP) of a radio terminal.

In a sixth aspect, a central unit of a base station includes at least one memory and at least one processor coupled to the at least one memory. The at least one processor is configured to receive, from a distributed unit of the base station, a message containing an information element indicating a change of an active downlink BWP of a radio terminal.

In a seventh aspect, a method for a distributed unit of a base station includes sending, to a central unit of the base station, a message containing an information element indicating a change of an active downlink Bandwidth Part (BWP) of a radio terminal.

In an eighth aspect, a method for a central unit of a base station includes receiving, from a distributed unit of the base station, a message containing an information element indicating a change of an active downlink BWP of a radio terminal.

In a ninth aspect, a program includes a set of instructions (software codes) that, when loaded into a computer, causes the computer to perform a method according to the above-described third, fourth, seventh, or eighth aspect.

According to the above-described aspects, it is possible to provide an apparatus, a method, and a program that contribute to enabling a central unit (e.g., an gNB-CU) of a base station (e.g., a gNB) to be aware of radio terminals (e.g., UEs), each of which stays in an active bandwidth part that is not configured with a Common Search Space.

BRIEF DESCRIPTION OF DRAWINGS

The above and other aspects, features, and advantages of the present disclosure will become more apparent from the following description of certain embodiments when taken in conjunction with the accompanying drawings, in which:

FIG. 10 shows an example of a format of an F1AP message (e.g., a BWP INFORMATION message) according to the third embodiment;

FIG. 12 shows an example of a format of an F1AP message (e.g., a UE CONTEXT MODIFICATION REQUIRED message) according to the fourth embodiment;

EMBODIMENTS

Specific embodiments will be described hereinafter in detail with reference to the drawings. The same or corresponding elements are denoted by the same symbols throughout the drawings, and duplicated explanations are omitted as necessary for the sake of clarity.

Each of the embodiments described below may be used individually, or two or more of the embodiments may be appropriately combined with one another. These embodiments include novel features different from each other. Accordingly, these embodiments contribute to attaining objects or solving problems different from one another and also contribute to obtaining advantages different from one another.

The following descriptions on the embodiments mainly focus on the 3GPP 5G systems. However, these embodiments may be applied to other radio communication systems.

First Embodiment

Figure 1:
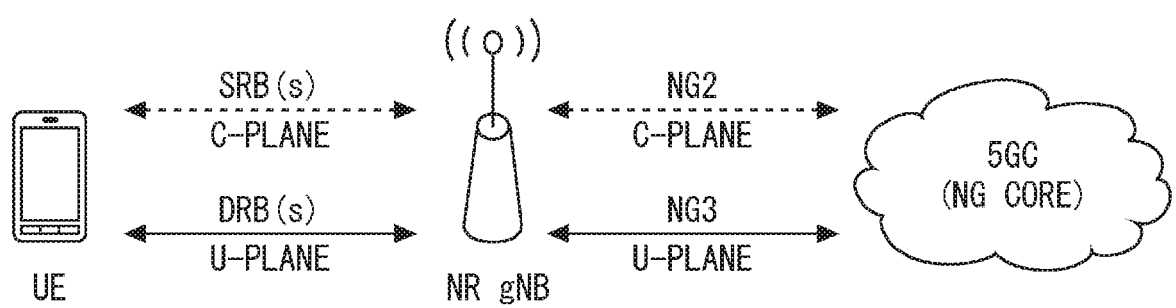
FIG. 1 shows a basic architecture of a 5G System.
Figure 2:
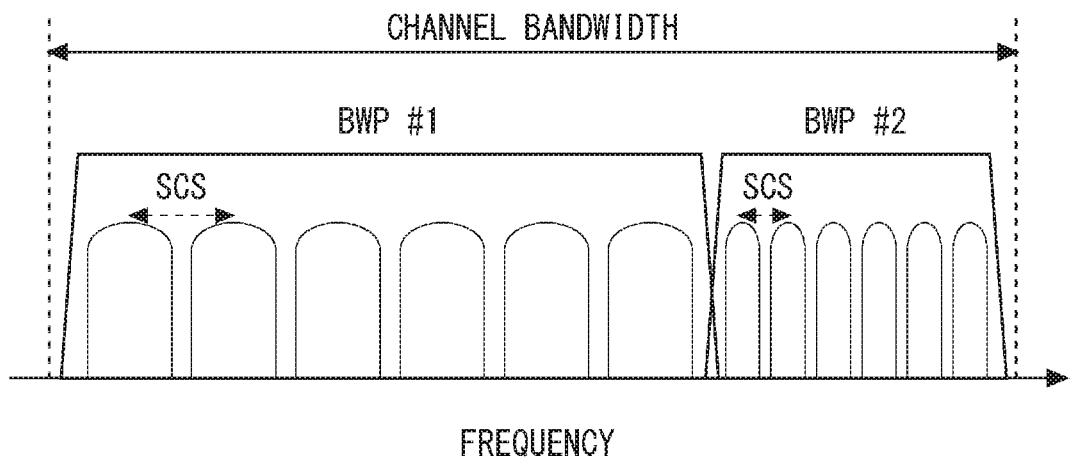
FIG. 2 shows an example of use of Bandwidth parts (BWPs)
Figure 3:
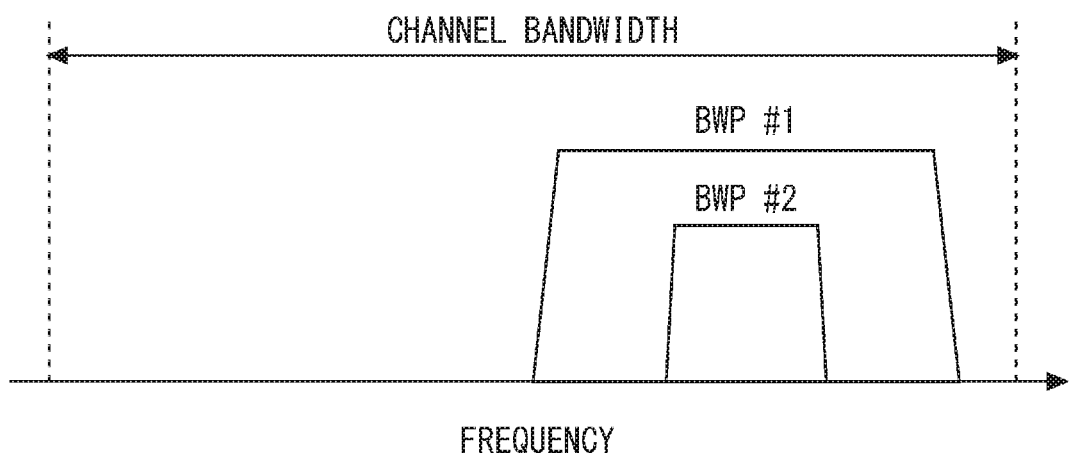
FIG. 3 shows an example of use of Bandwidth parts (BWPs)
Figure 4:
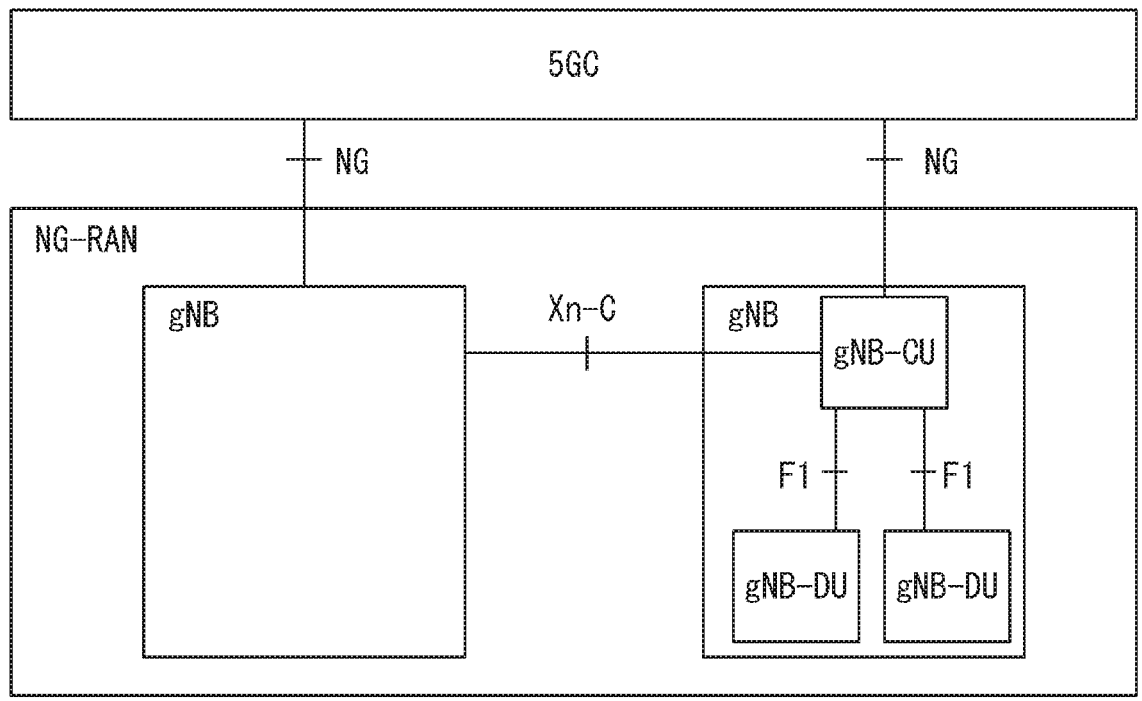
FIG. 4 shows an overall architecture of an NG-RAN.
Figure 5:
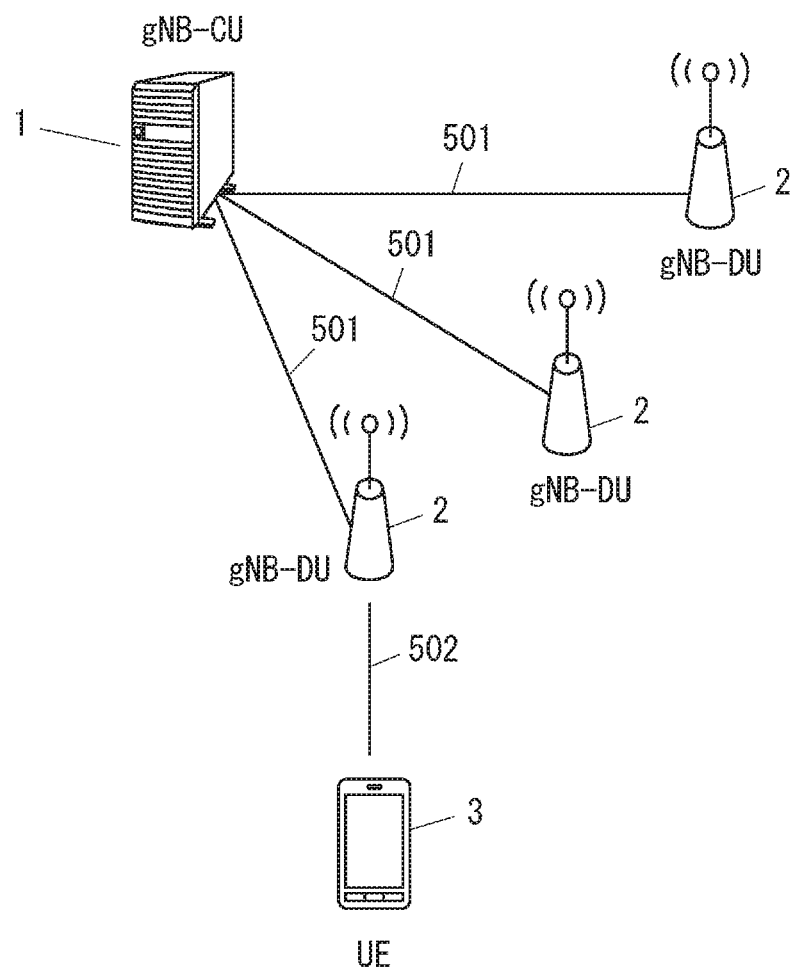
FIG. 5 shows a configuration example of a radio communication network according to a first embodiment.

FIG. 5 shows a configuration example of a radio communication network according to this embodiment. The radio communication network according to this embodiment includes a gNB Central Unit (gNB-CU) 1 and one or more gNB Distributed Units (gNB-DUs) 2. Each gNB-DU 2 is connected to the gNB-CU 1 through an interface 501. The interface 501 is an F1 interface. A UE 3 is connected to at least one gNB-DU 2 through at least one air interface 502.

Figure 6:
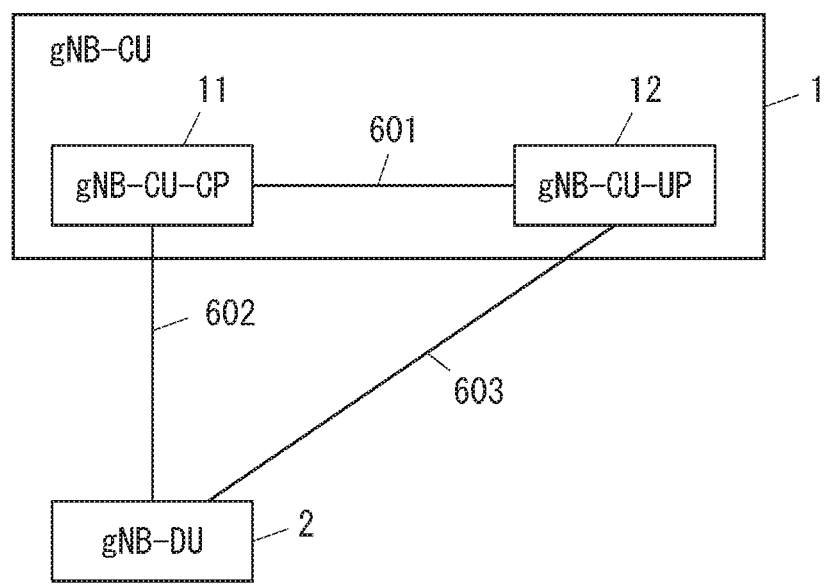
FIG. 6 shows a configuration example of a radio communication network according to the first embodiment.

As shown in FIG. 6, the gNB-CU 1 may include a Control Plane (CP) Unit (gNB-CU-CP) 11 and one or more User Plane (UP) Units (gNB-CU-UP) 12. In this case, the gNB-CU-CP 11 is connected to the gNB-CU-UP 12 through a control-plane interface 601 (i.e., an E1 interface). Further, the gNB-CU-CP 11 is connected to the gNB-DU 2 through a control-plane interface 602 (i.e., an F1-C interface). Meanwhile, the gNB-CU-UP 12 is connected to the gNB-DU 2 through a user-plane interface 603 (i.e., an F1-U interface).

The gNB-CU 1 may be a logical node that hosts the RRC, SDAP, and PDCP protocols of the gNB (or hosts the RRC and PDCP protocols of the gNB). The gNB-DU 2 may be a logical node that hosts the RLC, MAC, and PHY Layers of the gNB. In such a functional arrangement, the gNB-DU 2 may determine a BWP set to be configured for the UE 3 and notify the relevant gNB-CU 1 of a configuration of the BWP set for the UE 3. Further, the gNB-DU 2 may determine one or more (initial) active BWPs for the UE 3 and notify the relevant gNB-CU 1 of the active BWP(s). Alternatively, the gNB-CU 1 may determine a BWP set to be configured for the UE 3 and notify the relevant gNB-DU 2 of a configuration of the BWP set for the UE 3. Additionally or alternatively, the gNB-CU 1 may determine one or more (initial) active BWPs for the UE 3 and notify the relevant gNB-DU 2 of the active BWP(s). Note that in any of these cases, the gNB-DU 2 may change the active BWP(s) for the UE 3. That is, the gNB-DU 2 may determine the activation/deactivation of a BWP(s). Further, the gNB-DU 2 may notify the gNB-CU 1 of information about the BWP(s) after the change. The information about the BWP(s) after the change may be, for example, information indicating whether each BWP is activated or deactivated, or information indicating a difference between the BWP(s) before the change and the BWP(s) after the change.

Figure 7:
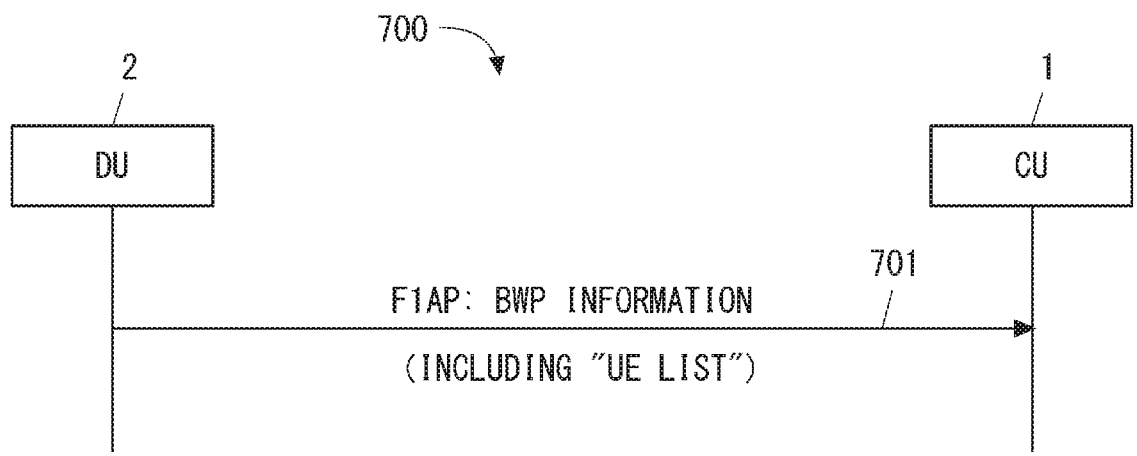
FIG. 7 is a sequence diagram showing an example of signaling between a CU and a DU according to the first embodiment.

FIG. 7 shows a process 700, which is an example of signaling between the gNB-CU 1 and the gNB-DU 2. In Step 701, the gNB-DU 2 sends an F1

Application Protocol message. The name of this message may be, but not limited to, a BWP INFORMATION message. This message contains at least one terminal list (i.e., a UE list). The at least one UE list indicates at least one of: (a) UEs, each of which is not configured with a Common Search Space (CSS) in an active downlink Bandwidth Part (BWP);

(b) UEs, each of which is not configured with at least a Search Space (SS) used for receiving SI in an active downlink BWP;
(c) UEs that need to receive updated SI dedicated signaling for each UE (or UEs to which updated SI needs to be transmitted via dedicated signaling for each UE, or UEs to which the gNB-CU 1 needs to transmit updated SI via dedicated signaling for each UE);
(d) UEs, an active DL BWP of each of which is a non-initial downlink BWP; and
(e) UEs that are performing reception on each of downlink BWPs.

By receiving, from the gNB-DU 2, a UE list indicating UEs each of which is not configured with a CSS in an active DL BWP (i.e., UEs whose active DL BWPs are configured with no CSS), the gNB-CU 1 can be aware of UEs staying in their respective active DL BWPs that are configured with no CSS. This thus, for example, allows the gNB-CU 1 to determine UEs to which transmission of updated SI via dedicated signaling (e.g., an RRC Reconfiguration message) is required. In other words, this allows the gNB-DU 2 to inform the gNB-CU 1 of UEs to which transmission of updated SI via dedicated signaling is required. This UE list is useful, for example, for implementations in which the gNB-DU 2 determines whether to configure a non-initial BWP with a CSS. This UE list may be a list of UEs staying in active DL BWPs that are configured with no CSS. The gNB-DU 2 may select UEs that are performing reception on active DL BWPs configured with no CSS, from among UEs in RRC_Connected in its cell, and then send a list of the selected UEs to the gNB-CU 1.

Additionally or alternatively, the gNB-DU 2 may send, to the gNB-CU 1, a list of UEs each of which is not configured with at least a Search Space (SS) for receiving SI (i.e., SI-SS) in an active DL BWP. By doing so, the gNB-CU 1 can be aware of UEs staying in active DL BWPs that are configured with no SI-SS. Note that the SI-SS may be contained in a CSS, or may be contained in a UE specific Search Space (USS).

By receiving, from the gNB-DU 2, a UE list indicating UEs that need to receive updated SI via dedicated signaling for each UE (per UE), the gNB-CU 1 can directly obtain knowledge about those UEs. This thus, for example, allows the gNB-CU 1 to determine UEs to which transmission of updated SI via dedicated signaling is required. This UE list is useful, for example, for implementations in which the gNB-DU 2 determines whether to configure a non-initial BWP with a CSS. The gNB-DU 2 may select UEs that are performing reception on active DL BWPs configured with no CSS, from among UEs in RRC_Connected in its cell, and then send a list of the selected UEs to the gNB-CU 1.

By receiving, from the gNB-DU 2, a UE list indicating UEs, an active DL BWP of each of which is a non-initial downlink BWP, the gNB-CU 1 can be aware of UEs staying in non-initial DL BWPs. This thus, for example, allows the gNB-CU 1 to determine UEs to which transmission of updated SI via dedicated signaling is required. The UE list is useful, for example, for implementations in which the gNB-CU 1 determines whether to configure a non-initial BWP with a CSS and instructs the gNB-DU 2 to configure this non-initial BWP with a CSS. Further, this UE list is also useful for implementations in which the gNB-DU 2 determines whether to configure a non-initial BWP with a CSS. In these implementations, the gNB-CU 1 may further refer to other information (e.g., a Cell Group Configuration (CG-Config or CellGroupConfig)) in order to be aware of whether each non-initial BWP is configured with a CSS. The gNB-DU 2 may select UEs that are performing reception on non-active DL BWPs from among UEs in RRC_Connected in its cell, and then send a list of the selected UEs to the gNB-CU 1.

By receiving, from the gNB-DU 2, a UE list indicating UEs that are performing reception on each of downlink BWPs (i.e., a list of UEs per BWP), the gNB-CU 1 can be aware of UEs staying in each DL BWP (i.e., UEs that use each DL BWP as their active DL BWPs). This thus, for example, allows the gNB-CU 1 to determine UEs to which transmission of updated SI via dedicated signaling is required. This UE list is useful, for example, for implementations in which the gNB-DU 2 determines whether to configure a non-initial BWP with a CSS. In these implementations, the gNB-CU 1 may further refer to other information (e.g., CG-Config or CellGroupConfig) in order to be aware of whether each non-initial BWP is configured with a CSS.

Specifically, during a UE Context Setup procedure, the gNB-CU 1 may check the contents of a CellGroupConfig IE included in a "DU to CU RRC Information" information element (IE) included in an F1AP: UE Context Setup Response message received from the gNB-DU 2. The gNB-DU 2 may incorporate information about a Common Search Space into the "CellGroupConfig" IE. Accordingly, by checking the CellGroupConfig IE, the gNB-CU 1 can be aware of whether each non-initial BWP is configured with a CSS by the gNB-DU 2.

Further, this UE list is also useful for implementations in which the gNB-CU 1 determines whether to configure a non-initial BWP with a CSS and instructs the gNB-DU 2 to configure this non-initial BWP with a CSS.

Each of the above-described UE lists may use any identifier to distinguish UEs from one another. For example, the identifier used to distinguish UEs in the UE list may be a Cell RNTI (C-RNTI), a gNB-CU UE F1AP ID, a gNB-DU UE F1AP ID, or a pair of a gNB-CU UE F1AP ID and a gNB-DU UE F1AP ID. The C-RNTI uniquely identifies, within a cell, a UE (or an RRC connection of a UE) for scheduling. The gNB-CU UE F1AP ID uniquely identifies, within the gNB-CU 1, a UE association on an F1 interface. The gNB-DU UE F1AP ID uniquely identifies, within the gNB-DU 2, a UE association on an F1 interface.

In some implementations, in response to receiving a first control message (i.e., an F1AP messages) containing a System Information Update Notification from the gNB-CU 1, the gNB-DU 2 may send a second control message (i.e., an F1AP messages) containing the above-described UE list to the gNB-CU 1. The system information update notification indicates that system information will be updated in the next modification period. This contributes to, when the gNB-CU 1 updates any SI, enabling the gNB-DU 2 to promptly inform the gNB-CU 1 of UEs to which transmission of this updated SI by dedicated signaling is required. Note that the system information may be, for example, a Warning Notification message of a Public Warning System (PWS) or a warning notification message of an Earthquake and Tsunami Warning System (ETWS) (e.g., an ETWS primary notification, or an ETWS secondary notification, or both).

The first control message may be a SYSTEM INFORMATION DELIVERY COMMAND message. Upon receiving the SYSTEM INFORMATION DELIVERY COMMAND message, the gNB-DU 2 broadcasts the requested system information via the CSS. Further, in this embodiment, the gNB-DU 2 sends the second control message containing the above-described UE list to the gNB-CU 1.

The name of this second control message may be, for example, but not limited to, a SYSTEM INFORMATION DELIVERY CONFIRM message.

Figure 8:
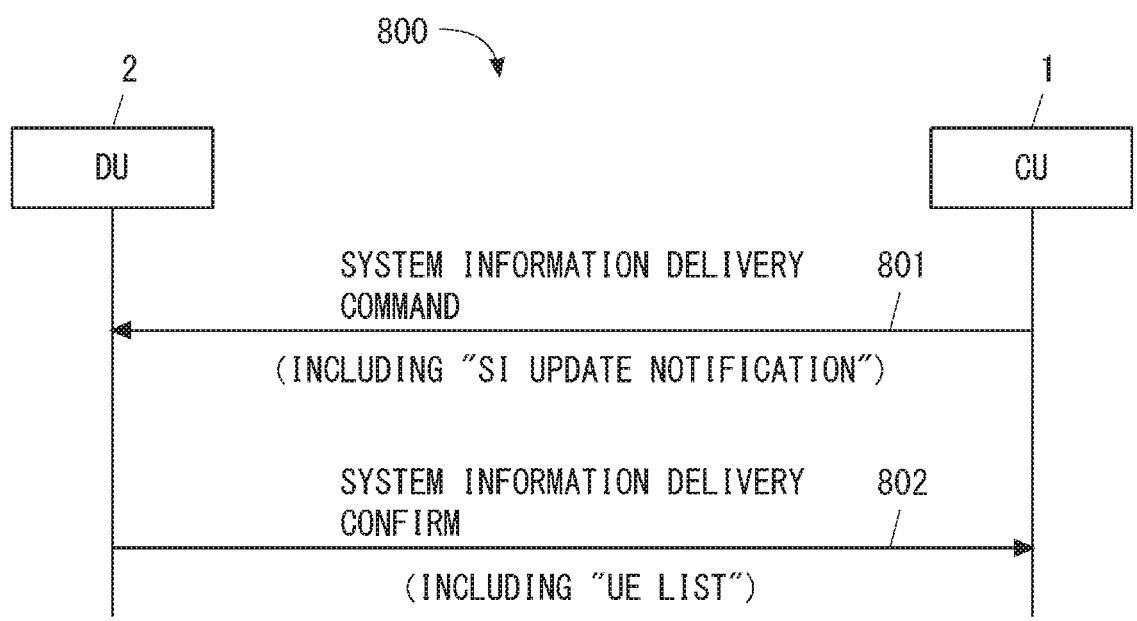
FIG. 8 is a sequence diagram showing an example of signaling between a CU and a DU according to a second embodiment.

FIG. 8 shows a process 800, which is an example of signaling between the gNB-CU 1 and the gNB-DU 2. In Step 801, the gNB-CU 1 sends to the gNB-DU 2 a SYSTEM INFORMATION DELIVERY COMMAND message containing a system information update notification. In Step 802, upon receiving the SYSTEM INFORMATION DELIVERY COMMAND message, the gNB-DU 2 sends to the gNB-CU 1 a SYSTEM INFORMATION DELIVERY CONFIRM message containing the above-described UE list.

Additionally or alternatively, the gNB-DU 2 may send the above-described UE list to the gNB-CU 1 upon its determining an update of system information. This contributes to, when SI is updated by the gNB-DU 2, enabling the gNB-DU 2 to promptly inform the gNB-CU 1 of presence of UEs to which transmission of updated SI by dedicated signaling is required.

Additionally or alternatively, the gNB-DU 2 may send the above-described UE list to the gNB-CU 1 in response to receiving a request for the UE list from the gNB-CU 1. This thus allows the gNB-CU 1 to be aware of UEs to which transmission of updated SI by dedicated signaling is required at a given time.

As can be understood from the above description, in this embodiment, the gNB-DU 2 is configured to send at least one UE list to the gNB-CU 1. The at least one UE list indicates at least one of:
(a) UEs, each of which is not configured with a Common Search Space (CSS) in an active downlink BWP;
(b) UEs, each of which is not configured with at least a Search Space (SS) used for receiving SI in an active downlink BWP;
(c) UEs that need to receive updated SI via dedicated signaling for each UE (or UEs to which updated SI needs to be transmitted via dedicated signaling for each UE, or UEs to which the gNB-CU 1 needs to transmit updated SI via dedicated signaling for each UE);
(d) UEs, an active DL BWP of each of which is a non-initial downlink BWP; and
(e) UEs that are performing reception on each of downlink BWPs.

This helps the gNB-CU 1 to obtain knowledge about UEs staying in active DL BWPs that are not configured with any CSSs. For example, by referring to this UE list, the gNB-CU 1 can determine UEs to which transmission of updated SI via dedicated signaling (e.g., an RRC Reconfiguration message) is required.

Second Embodiment

This embodiment provides details of signaling for transmission of updated SI. Configuration examples of a radio communication network according to this embodiment are similar to those shown in FIGS. 5 and 6.

Figure 9:
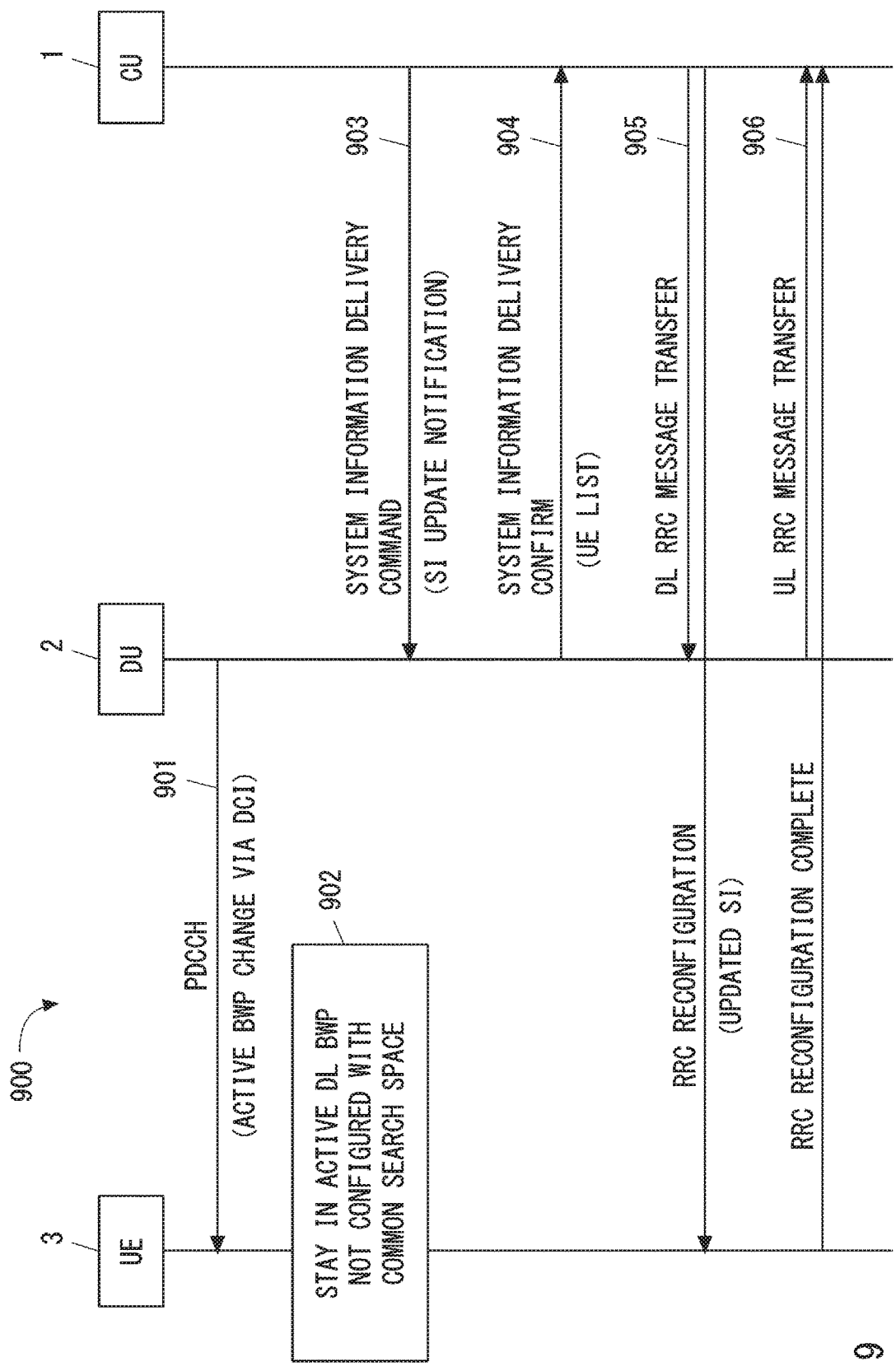
FIG. 9 is a sequence diagram showing an example of signaling for transmitting updated SI according to a third embodiment.

FIG. 9 shows a procedure 900, which is an example of signaling for transmission of updated SI. In Step 901, the gNB-DU 2 instructs the UE 3, via a PDCCH (i.e., DCI), to change the active DL BWP to a non-initial DL BWP that is not configured with a Common Search Space (CSS). In Step 902, the UE 3 stays in this non-initial DL BWP, which is configured with no CSS, and operates so as to receive signals on this non-initial DL BWP.

Steps 903 and 904 are similar to Steps 801 and 802 shown in FIG. 8. Specifically, in Step 903, the gNB-CU 1 sends a SYSTEM INFORMATION DELIVERY COMMAND message containing a system information update notification to the gNB-DU 2. In Step 904, upon receiving the SYSTEM INFORMATION DELIVERY COMMAND message, the gNB-DU 2 sends a SYSTEM INFORMATION DELIVERY CONFIRM message containing the UE list described in the first embodiment to the gNB-CU 1.

In Step 905, after receiving the UE list, the gNB-CU 1 transmits updated SI to one or more UEs 3 via per-UE dedicated signaling (e.g., a RRC Reconfiguration message). Specifically, by referring to the received UE list, the gNB-CU 1 obtains knowledge about UEs staying in active DL BWPs that are not configured with any CSSs and determines UEs to which transmission of updated SI via dedicated signaling is required. The RRC Reconfiguration message containing the updated SI is delivered from the gNB-CU 1 to the gNB-DU 2 on an F1 interface via a DL RRC MESSAGE TRANSFER message and then transmitted to the UE 3 by the gNB-DU 2.

In Step 906, the UE 3 transmits an RRC Reconfiguration Complete message to the gNB-CU 1. This RRC Reconfiguration Complete message is delivered from the gNB-DU 2 to the gNB-CU 1 on an F1 interface via a UL RRC MESSAGE TRANSFER message.

According to the procedure shown in FIG. 9, the gNB-CU 1 can determine UEs staying in active DL BWPs configured with no CSS and send updated SI to these UEs via dedicated signaling.

Third Embodiment

This embodiment provides details of an F1AP message for delivering the UE list described in the first embodiment. Configuration examples of a radio communication network according to this embodiment are similar to those shown in FIGS. 5 and 6.

FIG. 10 shows an example of a format of an F1AP message (e.g., a BWP INFORMATION message) for delivering the UE list described in the first embodiment. The message shown in FIG. 10 is transmitted to the gNB-CU 1 by the gNB-DU 2. The F1AP message (e.g., BWP INFORMATION message) shown in FIG. 10 includes a BWP list indicating all the (DL) BWPs. This BWP list includes a UE list (or UE ID list) per (DL) BWP. In the example shown in FIG. 10, the UE list (or UE ID list) uses C-RNTIs to distinguish UEs from one another. The UE list (or UE ID list) may use other identifiers (e.g., gNB-CU UE F1AP IDs or gNB-DU UE F1AP IDs) instead of C-RNTIs.

The F1AP message shown in FIG. 10 enables the gNB-DU 2 to provide, to the gNB-CU 1, a UE list indicating UEs that is performing reception on each DL BWP (i.e., a list of UEs per DL BWP).

Fourth Embodiment

Configuration examples of a radio communication network according to this embodiment are similar to those shown in FIGS. 5 and 6. The first to third embodiments provide examples in which the gNB-DU 2 provides a UE list to the gNB-CU 1. These examples described in the first to third embodiments use a procedure or signaling that is not associated with any UEs (i.e., a non-UE-associated procedure or signaling) to send the UE list from the gNB-DU 2 to the gNB-CU 1. Accordingly, the first to third embodiments have an advantage over other techniques using a UE-associated procedure or signaling in that they can reduce the number of signaling messages between the gNB-CU 1 and the gNB-DU 2.

However, in some implementations, the gNB-DU 2 may inform the gNB-CU 1 of a change of the active DL BWP of the UE 3 by using a procedure or signaling associated with this UE (i.e., a UE-associated procedure or signaling). In this embodiment, the gNB-DU 2 sends a message indicating a change of the active DL BWP of the UE 3 to the gNB-CU 1. The gNB-DU 2 may send a message indicating a change of the active DL BWP of the UE 3 to the gNB-CU 1 in response to the change of the active DL BWP of the UE 3. The gNB-DU 2 may send a message indicating a change of the active DL BWP of the UE 3 to the gNB-CU 1 after the change of the active DL BWP of the UE 3. Specifically, the gNB-DU 2 may inform the gNB-CU 1 that the active DL BWP of the UE 3 has been changed from the initial BWP to a non-initial DL BWP (in particular, to a non-initial DL BWP having no CSS). In this way, the gNB-CU 1 can be aware of UEs staying in active DL BWPs that are configured with no CSS. This thus, for example, allows the gNB-CU 1 to determine UEs to which transmission of updated SI via dedicated signaling is required.

In some implementations, when the gNB-DU 2 has changed or switched the active DL BWP of the UE 3, it may send, to the gNB-CU 1, a message including an information element indicating the change or switching of the active DL BWP of the UE 3 during a UE Context Modification Required procedure initiated by the gNB-DU 2. Specifically, in response to a change of the active DL BWP of the UE 3 from the initial BWP to a non-initial DL BWP (in particular, to a non-initial DL BWP having no CSS), the gNB-DU 2 may send a message including this information element to the gNB-CU 1. The gNB-DU 2 may incorporate this information element into an F1AP: UE CONTEXT MODIFICATION REQUIRED message.

This information element may be a BOOLEAN data type variable indicating whether the active DL BWP of the UE 3 has been changed from the initial DL BWP to a non-initial DL BWP. Alternatively, this information element may be an ENUMERATED type variable indicating that the active DL BWP of the UE 3 has no CSS. Alternatively, this information element may be an INTEGER type variable indicating an identifier (e.g., a BWP ID) of the active DL BWP of the UE 3.

Figure 11:
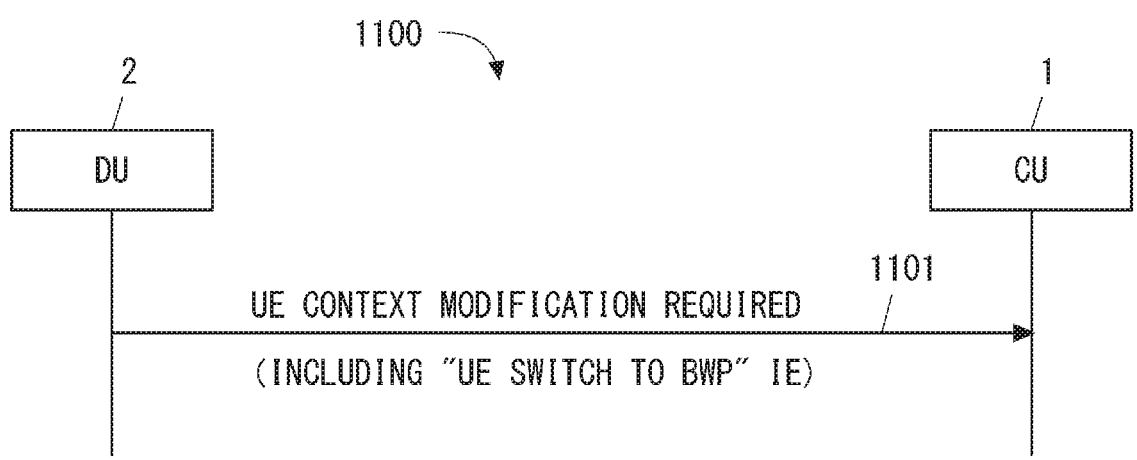
FIG. 11 is a sequence diagram showing an example of signaling between a CU and a DU according to a fourth embodiment.

FIG. 11 shows a procedure 1100, which is an example of signaling according to this embodiment. In Step 1101, the gNB-DU 2 sends a UE CONTEXT MODIFICATION REQUIRED message. This message includes the information element described in this embodiment.

FIG. 12 shows an example of a format of an F1 message containing the information element described in this embodiment. A UE CONTEXT MODIFICATION REQUIRED message shown in FIG. 12 is transmitted to the gNB-CU 1 by the gNB-DU 2 in order to request a modification of a UE context. The UE CONTEXT MODIFICATION REQUIRED message shown in FIG. 12 includes a "UE switch to BWP" information element (IE). As described above, the "UE switch to BWP" IE may be a BOOLEAN data type variable indicating whether the active DL BWP of the UE 3 has been changed from the initial DL BWP to a non-initial DL BWP. Alternatively, the "UE switch-to BWP" IE may be an ENUMERATED type variable indicating that the active DL BWP of the UE 3 has no CSS.

The UE CONTEXT MODIFICATION REQUIRED message of FIG. 12 may include a "BWP-ID" information element (IE) instead of the "UE switch to BWP" IE. The "BWP-ID" IE may be an INTEGER type variable indicating an identifier (e.g., a BWP ID) of the active DL BWP of the UE 3.

Figure 13:
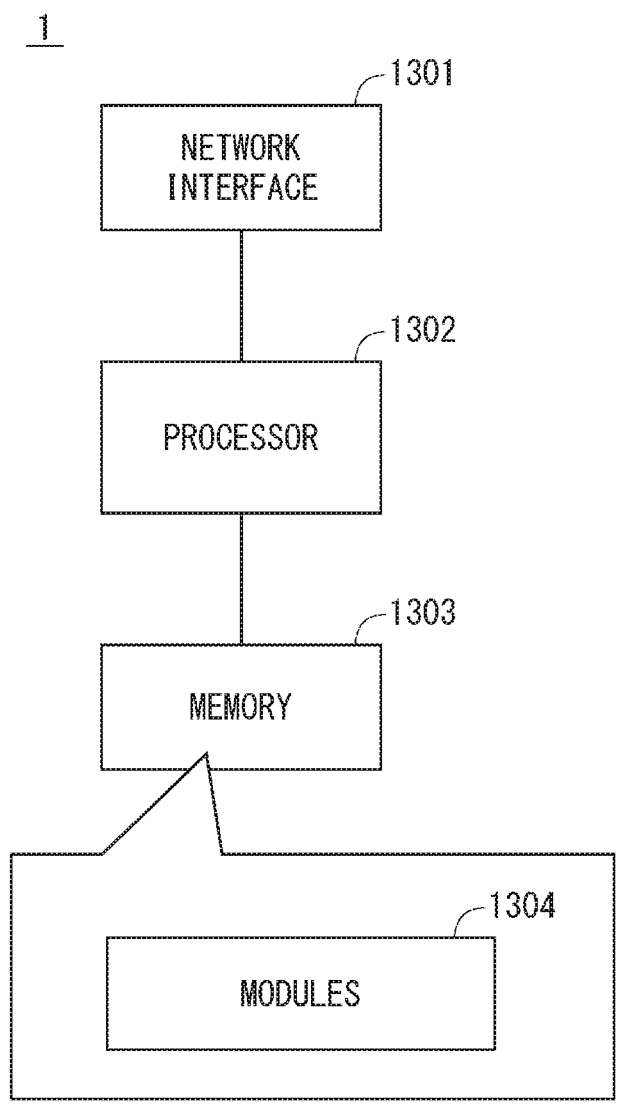
FIG. 13 is a block diagram showing a configuration example of a central node (e.g., an gNB-CU) according to some embodiments.

The following provides configuration examples of the gNB-CU 1 and the gNB-DU 2 according to the above embodiments. FIG. 13 is a block diagram showing a configuration example of the gNB-CU 1 according to the above embodiments. Note that configuration examples of the gNB-CU-CP 11 and the gNB-CU-UP 12 may be similar to those shown in FIG. 13. As shown in FIG. 13, the gNB-CU 1 includes a network interface 1301, a processor 1302, and a memory 1303. The network interface 1301 is used to communicate with a network node (e.g., the gNB-DU 2, and control-plane (CP) nodes and user-plane (UP) nodes in the 5GC). The network interface 1301 may include a plurality of interfaces. The network interface 1301 may include an optical-fiber interface for CU-DU communication and a network interface conforming to IEEE 802.3 series.

The processor 1302 performs digital baseband signal processing (i.e., data-plane processing) and control-plane processing for radio communication. The processor 1302 may include a plurality of processors. The processor 1302 may include a modem processor (e.g., a Digital Signal Processor (DSP)) that performs the digital baseband signal processing and a protocol stack processor (e.g., a Central Processing Unit (CPU) or a Micro Processing Unit (MPU)) that performs the control-plane processing.

The memory 1303 is a volatile memory, a nonvolatile memory, or a combination thereof. The volatile memory is, for example, a Static Random Access Memory (SRAM), a Dynamic RAM (DRAM), or a combination thereof. The non-volatile memory is, for example, a mask Read Only Memory (MROM), an Electrically Erasable Programmable ROM (EEPROM), a flash memory, a hard disc drive, or any combination thereof. The memory 1303 may include a storage located separately from the processor 1302. In this case, the processor 1302 may access the memory 1303 through the network interface 1301 or an I/O interface (not shown).

The memory 1303 may store one or more software modules (computer programs) 1304 including instructions and data to perform processing by the gNB-CU 1 described in the above embodiments. In some implementations, the processor 1302 may load the one or more software modules 1304 from the memory 1303 and execute the loaded software modules, thereby performing the processing of the gNB-CU 1 described in the above embodiments.

Figure 14:
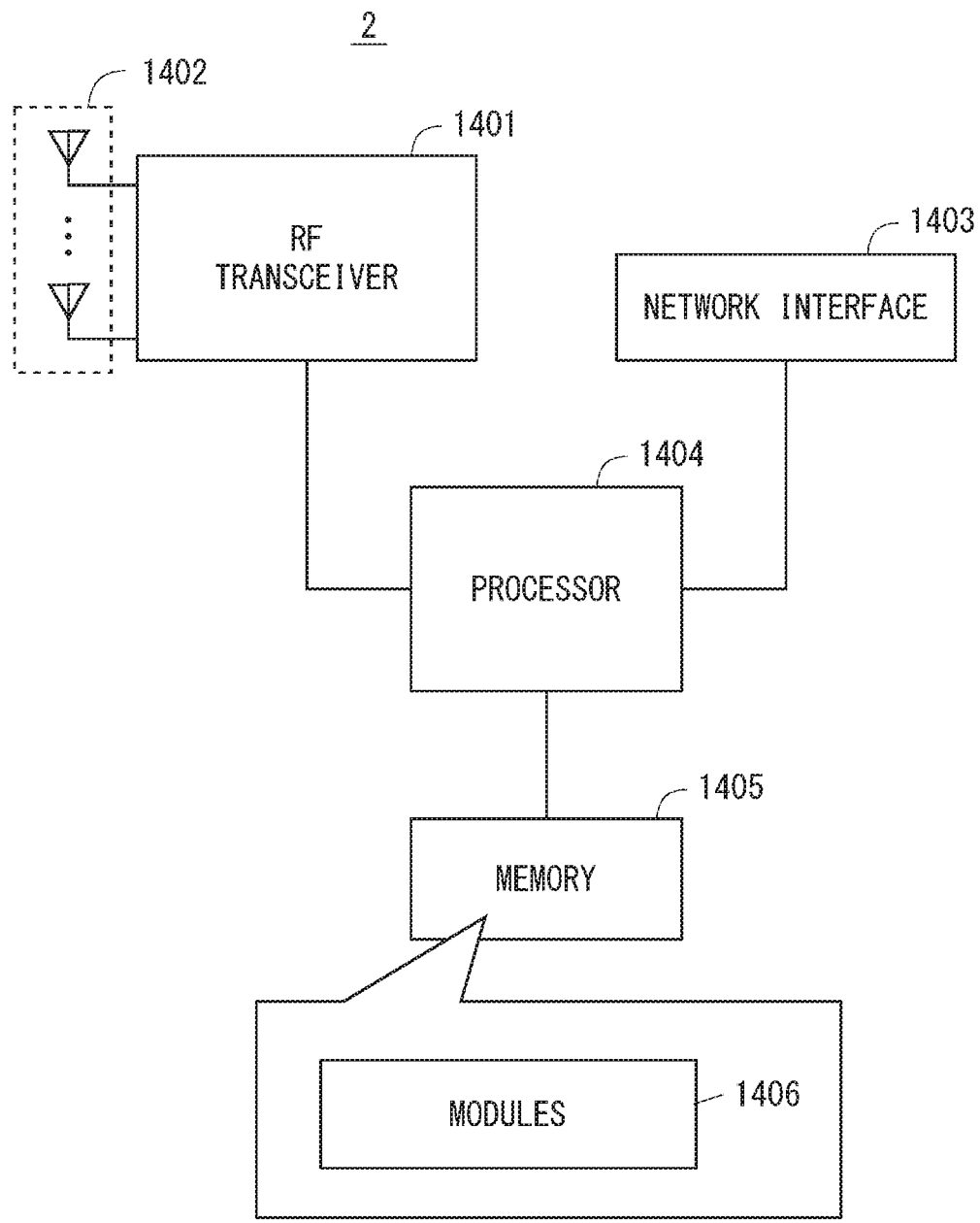
FIG. 14 is a block diagram showing a configuration example of a distributed node (e.g., a gNB-DU) according to some embodiments.

FIG. 14 is a block diagram showing a configuration example of the gNB-DU 2 according to the above embodiments. As shown in FIG. 14, the gNB-DU 2 includes a Radio Frequency transceiver 1401, a network interface 1403, a processor 1404, and a memory 1405. The RF transceiver 1401 performs analog RF signal processing to communicate with NG UEs. The RF transceiver 1401 may include a plurality of transceivers. The RF transceiver 1401 is connected to an antenna array 1402 and the processor 1404. The RF transceiver 1401 receives modulated symbol data from the processor 1404, generates a transmission RF signal, and supplies the generated transmission RF signal to the antenna 1402. Further, the RF transceiver 1401 generates a baseband reception signal based on a reception RF signal received by the antenna 1402 and supplies this signal to the processor 1404. The RF transceiver 1401 may include an analog beam former circuit for beam forming. The analog beam former circuit includes, for example, a plurality of phase shifters and a plurality of power amplifiers.

The network interface 1403 is used to communicate with network nodes (e.g., the gNB-CU 1, the gNB-CU-CP 11, and the gNB-CU-UP 12). The network interface 1403 may include a plurality of interfaces. The network interface 1403 may include either or both of an optical-fiber interface for CU-DU communication and a network interface conforming to IEEE 802.3 series.

The processor 1404 performs digital baseband signal processing (i.e., data-plane processing) and control-plane processing for radio communication. The processor 1404 may include a plurality of processors. The processor 1404 may include a modem processor (e.g., a DSP)) that performs the digital baseband signal processing and a protocol stack processor (e.g., a CPU or an MPU) that performs the control-plane processing. The processor 1404 may include a digital beam former module for beam forming. The digital beam former module may include a Multiple Input Multiple Output (MIMO) encoder and a MIMO pre-coder.

The memory 1405 is a volatile memory, a nonvolatile memory, or a combination thereof. The volatile memory is, for example, an SRAM, a DRAM, or a combination thereof. The non-volatile memory is, for example, an MROM, an EEPROM, a flash memory, a hard disc drive, or any combination thereof. The memory 1405 may include a storage located separately from the processor 1404. In this case, the processor 1404 may access the memory 1405 through the network interface 1403 or an I/O interface (not shown).

The memory 1405 may store one or more software modules (computer programs) 1406 including instructions and data to perform processing by the gNB-DU 2 described in the above embodiments. In some implementations, the processor 1404 may load the one or more software modules 1406 from the memory 1405 and execute the loaded software modules, thereby performing the processing of the gNB-DU 2 described in the above embodiments.

As described above with reference to FIGS. 13 to 14, each of the processors included in the gNB-CU 1 and the gNB-DU 2 in the above embodiments executes one or more programs including a set of instructions to cause a computer to perform an algorithm described above with reference to the drawings. These programs may be stored in various types of non-transitory computer readable media and thereby supplied to computers. The non-transitory computer readable media includes various types of tangible storage media. Examples of the non-transitory computer readable media include a magnetic recording medium (such as a flexible disk, a magnetic tape, and a hard disk drive), a magneto-optic recording medium (such as a magneto-optic disk), a Compact Disc Read Only Memory (CD-ROM), CD-R, CD-R/W, and a semiconductor memory (such as a mask ROM, a Programmable ROM (PROM), an Erasable PROM (EPROM), a flash ROM, and a Random Access Memory (RAM)). These programs may be supplied to computers by using various types of transitory computer readable media. Examples of the transitory computer readable media include an electrical signal, an optical signal, and an electromagnetic wave. The transitory computer readable media can be used to supply programs to a computer through a wired communication line (e.g., electric wires and optical fibers) or a wireless communication line.

Other Embodiments

The above embodiments provide examples in which the gNB-CU 1 uses a UE list received from the gNB-DU 2 to determine UEs to which transmission of updated SI via dedicated signaling is required. However, the gNB-CU 1 may use this UE list, received from the gNB-DU 2, for other purposes.

The signaling between the gNB-CU 1 and the gNB-DU 2 described in the above embodiments may be performed between the gNB-CU-CP 11 and the gNB-DU 2

Further, the above embodiments are merely examples of applications of the technical ideas obtained by the inventors. These technical ideas are not limited to the above embodiments and various modifications may be made thereto.

For example, the whole or part of the embodiments disclosed above can be described as, but not limited to, the following supplementary notes.

(Supplementary Note 1)

A distributed unit of a base station, the distributed unit comprising:

at least one memory; and at least one processor coupled to the at least one memory and configured to send, to a central unit of the base station, at least one terminal list indicating at least one of:

a plurality of radio terminals, each of which is not configured with a Common Search Space (CSS) in an active downlink Bandwidth Part (BWP);

a plurality of radio terminals, each of which is not configured with at least a Search Space (SS) used for receiving system information in an active downlink BWP;

a plurality of radio terminals that need to receive updated system information via dedicated signaling for each radio terminal;

a plurality of radio terminals, an active downlink BWP of each of which is a non-initial downlink BWP; and a plurality of radio terminals that are performing reception on each of downlink BWPs.

(Supplementary Note 2)

The distributed unit according to Supplementary note 1, wherein the at least one processor is configured to send the at least one terminal list to the central unit in response to receiving from the central unit a first control message containing a system information update notification.

(Supplementary Note 3)

The distributed unit according to Supplementary note 2, wherein the first control message is a SYSTEM INFORMATION DELIVERY COMMAND message.

(Supplementary Note 4)

The distributed unit according to any one of Supplementary notes 1 to 3, wherein the at least one processor is configured to send the at least one terminal list to the central unit in response to determining an update of system information.

(Supplementary Note 5)

The distributed unit according to any one of Supplementary notes 1 to 4, wherein the at least one processor is configured to send the at least one terminal list to the central unit in response to receiving a request from the central unit.

(Supplementary Note 6)

The distributed unit according to any one of Supplementary notes 1 to 5, wherein the at least one terminal list indicates a plurality of radio terminals, an active downlink BWP of each of which is not configured with a Common Search Space (CSS).

(Supplementary Note 7)

The distributed unit according to any one of Supplementary notes 1 to 5, wherein the at least one terminal list indicates a plurality of radio terminals, an active downlink BWP of each of which is not configured with at least a Search Space (SS) used for receiving system information.

(Supplementary Note 8)

The distributed unit according to any one of Supplementary notes 1 to 5, wherein the at least one terminal list indicates a plurality of radio terminals, an active downlink BWP of each of which is a non-initial downlink BWP.

(Supplementary Note 9)

The distributed unit according to any one of Supplementary notes 1 to 5, wherein the at least one terminal list includes a per-BWP terminal list for indicating a plurality of radio terminals that are performing reception on each of downlink BWPs.

(Supplementary Note 10)

A central unit of a base station, comprising:
at least one memory; and
at least one processor coupled to the at least one memory and configured to receive, from a distributed unit of the base station, at least one terminal list indicating at least one of:
a plurality of radio terminals, each of which is not configured with a Common Search Space (CSS) in an active downlink Bandwidth Part (BWP);
a plurality of radio terminals, each of which is not configured with at least a Search Space (SS) used for receiving system information in an active downlink BWP;
a plurality of radio terminals that need to receive updated system information via dedicated signaling for each radio terminal;
a plurality of radio terminals, an active downlink BWP of each of which is a non-initial downlink BWP; and
a plurality of radio terminals that are performing reception on each of downlink BWPs.

(Supplementary Note 11)

The central unit according to Supplementary note 10, wherein
the at least one processor is configured to send to the distributed unit a first control message containing a system information update notification, and
the first control message causes the distributed unit to send the at least one terminal list to the central unit.

(Supplementary Note 12)

The central unit according to Supplementary note 11, wherein the first control message is a SYSTEM INFORMATION DELIVERY COMMAND message.

(Supplementary Note 13)

The central unit according to any one of Supplementary notes 10 to 12, wherein the at least one processor is configured to send a request for the at least one terminal list to the distributed unit.

(Supplementary Note 14)

The central unit according to any one of Supplementary notes 10 to 13, wherein the at least one processor is configured to, after receiving the at least one terminal list, transmit updated system information to one or more radio terminals via per-radio terminal dedicated signaling.

(Supplementary Note 15)

The central unit according to any one of Supplementary notes 10 to 14, wherein the at least one terminal list indicates a plurality of radio terminals, an active downlink BWP of each of which is not configured with a Common Search Space (CSS).

(Supplementary Note 16)

The central unit according to any one of Supplementary notes 10 to 14, wherein the at least one terminal list indicates a plurality of radio terminals, an active downlink BWP of each of which is not configured with at least a Search Space (SS) used for receiving system information.

(Supplementary Note 17)

The central unit according to any one of Supplementary notes 10 to 14, wherein the at least one terminal list indicates a plurality of radio terminals, an active downlink BWP of each of which is a non-initial downlink BWP.

(Supplementary Note 18)

The central unit according to any one of Supplementary notes 10 to 14, wherein the at least one terminal list includes a per-BWP terminal list for indicating a plurality of radio terminals that are performing reception on each of downlink BWPs.

(Supplementary Note 19)

A method for a distributed unit of a base station, the method comprising sending, to a central unit of the base station, at least one terminal list indicating at least one of:
a plurality of radio terminals, each of which is not configured with a Common Search Space (CSS) in an active downlink Bandwidth Part (BWP);
a plurality of radio terminals, each of which is not configured with at least a Search Space (SS) used for receiving system information in an active downlink BWP;
a plurality of radio terminals that need to receive updated system information via dedicated signaling for each radio terminal;
a plurality of radio terminals, an active downlink BWP of each of which is a non-initial downlink BWP; and
a plurality of radio terminals that are performing reception on each of downlink BWPs.

(Supplementary Note 20)

A method for a central unit of a base station, the method comprising receiving, from a distributed unit of the base station, at least one terminal list indicating at least one of:
a plurality of radio terminals, each of which is not configured with a Common Search Space (CSS) in an active downlink Bandwidth Part (BWP);
a plurality of radio terminals, each of which is not configured with at least a Search Space (SS) used for receiving system information in an active downlink BWP;
a plurality of radio terminals that need to receive updated system information via dedicated signaling for each radio terminal;
a plurality of radio terminals, an active downlink BWP of each of which is a non-initial downlink BWP; and
a plurality of radio terminals that are performing reception on each of downlink BWPs.

(Supplementary Note 21)

A program for causing a computer to perform a method for a distributed unit of a base station, wherein the method comprises sending, to a central unit of the base station, at least one terminal list indicating at least one of:
a plurality of radio terminals, each of which is not configured with a Common Search Space (CSS) in an active downlink Bandwidth Part (BWP);
a plurality of radio terminals, each of which is not configured with at least a Search Space (SS) used for receiving system information in an active downlink BWP;
a plurality of radio terminals that need to receive updated system information via dedicated signaling for each radio terminal;
a plurality of radio terminals, an active downlink BWP of each of which is a non-initial downlink BWP; and
a plurality of radio terminals that are performing reception on each of downlink BWPs.

(Supplementary Note 22)

A program for causing a computer to perform a method for a central unit of a base station, wherein the method comprises receiving, from a distributed unit of the base station, at least one terminal list indicating at least one of:

a plurality of radio terminals, each of which is not configured with a Common Search Space (CSS) in an active downlink Bandwidth Part (BWP);

a plurality of radio terminals, each of which is not configured with at least a Search Space (SS) used for receiving system information in an active downlink BWP;

a plurality of radio terminals that need to receive updated system information via dedicated signaling for each radio terminal;

a plurality of radio terminals, an active downlink BWP of each of which is a non-initial downlink BWP; and a plurality of radio terminals that are performing reception on each of downlink BWPs.

(Supplementary Note 23)

A distributed unit of a base station, comprising:

at least one memory; and at least one processor coupled to the at least one memory and configured to send, to a central unit of the base station, a message containing an information element indicating a change of an active downlink Bandwidth Part (BWP) of a radio terminal.

(Supplementary Note 24)

The distributed unit according to Supplementary note 23, wherein the at least one processor is configured to send the message to the central unit of the base station in response to the change of the active downlink BWP of the radio terminal.

(Supplementary Note 25)

The distributed unit according to Supplementary note 23 or 24, wherein the information element indicates whether or not the active downlink BWP of the radio terminal has been changed from an initial downlink BWP to a non-initial downlink BWP.

(Supplementary Note 26)

The distributed unit according to Supplementary note 23 or 24, wherein the information element indicates that the active downlink BWP of the radio terminal includes no Common Search Space.

(Supplementary Note 27)

The distributed unit according to Supplementary note 23 or 24, wherein the information element indicates an identifier of the active downlink BWP after the change.

(Supplementary Note 28)

A central unit of a base station, comprising:

at least one memory; and at least one processor coupled to the at least one memory and configured to receive, from a distributed unit of the base station, a message containing an information element indicating a change of an active downlink BWP of a radio terminal.

(Supplementary Note 29)

The central unit according to Supplementary note 28, wherein the information element indicates whether or not the active downlink BWP of the radio terminal has been changed from an initial downlink BWP to a non-initial downlink BWP.

(Supplementary Note 30)

The central unit according to Supplementary note 28, wherein the information element indicates that the active downlink BWP of the radio terminal includes no Common Search Space.

(Supplementary Note 31)

The central unit according to Supplementary note 28, wherein the information element indicates an identifier of the active downlink BWP after the change.

(Supplementary Note 32)

The central unit according to any one of Supplementary notes 28 to 31, wherein the at least one processor is configured to, after receiving the information element, transmit updated system information to the radio terminal via per-radio terminal dedicated signaling.

(Supplementary Note 33)

A method for a distributed unit of a base station, the method comprising sending, to a central unit of the base station, a message containing an information element indicating a change of an active downlink Bandwidth Part (BWP) of a radio terminal.

(Supplementary Note 34)

A method for a central unit of a base station, the method comprising receiving, from a distributed unit of the base station, a message containing an information element indicating a change of an active downlink BWP of a radio terminal.

What is claimed is:

1. A method of a gNB distributed unit (gNB-DU), the method comprising:
    receiving a message from a gNB central unit (gNB-CU), the message indicating System Information (SI) to be broadcast; and
    transmitting a list to the gNB-CU in response to the message, the list indicating at least one User Equipment (UE) which is unable to receive the SI from the broadcast and needs to receive the SI via dedicated signaling.

2. The method according to claim 1, further comprising:
    receiving an updated SI included in a RRC Reconfiguration message from the gNB-CU, the Radio Resource Control (RRC) Reconfiguration message is included in a DL RRC Message Transfer message; and
    transmitting the updated SI included in the RRC Reconfiguration to a UE which is one of the at least one UE in the list.

3. The method according to claim 1, wherein the list includes a gNB-CU UE F1AP ID.

4. The method according to claim 1, wherein the message is an F1AP message.

5. The method according to claim 1, wherein the message indicates a warning notification message of a Public Warning System (PWS) or an Earthquake and Tsunami Warning System (ETWS).

6. The method according to claim 1, wherein the at least one UE indicated in the list is one or more UEs, each of which is not configured with a Common Search Space (CSS) in an active downlink (DL) bandwidth part (BWP).

7. The method according to claim 1, wherein the at least one UE comprises a plurality of UEs, each of which needs to receive the SI via dedicated signaling.

8. The method according to claim 1, wherein the message comprises an information element indicating the SI.

9. The method according to claim 1, wherein the SI is broadcasted via Physical Downlink Shared Channel (PDSCH).

10. A method of a gNB central unit (gNB-CU), the method comprising:
    transmitting a message to a gNB distributed unit (gNB-DU), the message indicating System Information (SI) to be broadcast; and
    receiving a list from the gNB-DU in response to the message, the list indicating at least one User Equipment (UE) which is unable to receive the SI from the broadcast and needs to receive the SI via dedicated signaling.

11. The method according to claim 10, further comprising:
transmitting an updated SI included in a Radio Resource Control (RRC) Reconfiguration message to the gNB-DU, the RRC Reconfiguration message is included in a DL RRC Message Transfer message and the updated SI included in the RRC Reconfiguration to be transmitted, by the gNB-DU, to a UE, which is one of the at least one UE in the list.

12. The method according to claim 10, wherein the list includes a gNB-CU UE F1AP ID.

13. The method according to claim 10, wherein the message is an F1AP message.

14. The method according to claim 10, wherein the message indicates a warning notification message of a Public Warning System (PWS) or an Earthquake and Tsunami Warning System (ETWS).

15. A method of a gNB including a central unit (gNB-CU) and a gNB distributed unit (gNB-DU), the method comprising:
transmitting, by the gNB-CU a message to the gNB-DU, the message indicating System Information (SI) to be broadcast; and
receiving, by the gNB-CU, a list from the gNB-DU in response to the message, the list indicating at least one User Equipment (UE) which is unable to receive the SI from the broadcast and needs to receive the SI via dedicated signaling.

16. The method according to claim 15, further comprising:
receiving, by the gNB-DU, an updated SI included in a Radio Resource Control (RRC) Reconfiguration message from the gNB-CU, the RRC Reconfiguration message is included in a DL RRC Message Transfer message; and
transmitting, by the gNB-DU, the updated SI included in the RRC Reconfiguration to a UE which is one of the at least one UE in the list.

17. The method according to claim 15, wherein the list includes a gNB-CU UE F1AP ID.

18. The method according to claim 15, wherein the message is an F1AP message.

19. The method according to claim 15, wherein the message indicates a warning notification message of a Public Warning System (PWS) or an Earthquake and Tsunami Warning System (ETWS).

* * * * *